United States Patent [19]

Foley, Jr.

[11] 4,252,421
[45] Feb. 24, 1981

[54] CONTACT LENSES WITH A COLORED CENTRAL AREA

[75] Inventor: William M. Foley, Jr., Glendale, Calif.

[73] Assignee: John D. McCarry, El Toro, Calif.

[21] Appl. No.: 959,310

[22] Filed: Nov. 9, 1978

[51] Int. Cl.³ .................................................. G02C 7/04
[52] U.S. Cl. ................................. 351/162; 351/160 H
[58] Field of Search ............................ 351/160 H, 162

[56] References Cited

U.S. PATENT DOCUMENTS

| 3,679,504 | 7/1972 | Wichterle | 351/162 X |
| 4,051,138 | 9/1977 | Wang et al. | 260/278 |
| 4,088,572 | 5/1978 | Cooper et al. | 210/23 F |
| 4,093,361 | 6/1978 | Erickson et al. | 351/160 |

OTHER PUBLICATIONS

Newcomer, et al., "Method of Tinting Soflens ® Contact Lenses," *Amer. Jour. of Optometry and Physiological Optics*, vol. 54, No. 3, pp. 160–164.

Davison, et al., "Silicon Phthalocyanine–Siloxane Polymers," *Macromolocules*, vol. 11, No. 1, Jan.–Feb. 1978, pp. 186–191.

"Tinted Lenses: New Life for Dead Eyes," *Contact Lens Forum*, vol. 3, No. 3., Mar. 1978, pp. 13–17.

"Tinted Lenses," *Contact Lens Forum*, vol. 3, No. 8, Aug. 1978, p. 89.

*Primary Examiner*—John K. Corbin
*Assistant Examiner*—Scott J. Sugarman
*Attorney, Agent, or Firm*—Knobbe, Martens, Olson, Hubbard & Bear

[57] ABSTRACT

Contact lenses and a method of preparing the same in which a central area tinted with particular polymer bound or water insoluble colorants are disclosed.

4 Claims, No Drawings

CONTACT LENSES WITH A COLORED CENTRAL AREA

BACKGROUND OF THE INVENTION

Conventional contact lenses are hard lenses polymerized using the principal co-monomer, methyl methacrylate.

Nearly all of these hard contact lenses are manufactured from lens blanks which are tinted or colored. Hard contact lenses are also known in the field as corneal lenses. Most commonly, hard contact lenses are fitted with a diameter which is less than the diameter of the cornea of the eye. This allows for the entire contact lens to be colored and appear quite natural on the eye.

On Oct. 20, 1978, the Contact Lens Manufacturers Association held a convention in which one of its speakers was the president of Glass-Flex Corporation. During this discussion the speaker mentioned the problems involved in coloring entire hard lenses through the use of pigments which presented problems in their ability to disperse uniformly throughout the lens.

Soft contact lenses in contrast to hard lenses are most commonly fitted with a diameter larger than that of the cornea.

Attempts have been made to tint soft contact lenses. One prior art method is to paint or print a colored central portion onto a soft contact lens using an implement such as a brush. This painting or chemical printing process has been practiced by foreign lens makers for several years. Woehlk-Contact-Lenses, Ltd. for Titmus-Eurocon have been producing printed or painted iris soft contact lenses. The clear lens is first fitted to be sure the lens is correct for the patient and then returned to the laboratory for printing.[1]

1. *Contact Lens Forum,* Vol. 3, No. 8, August, 1978, p. 89.

Dr. Leroy G. Meshel, a California ophthalmologist, working with a chemist, Vernon Gregory, has developed a chemical printing process for coloring soft contact lenses. This process, which appears to be quite similar to those mentioned above, colors the surface of the lens after the clear lens has been first fitted by the patient's doctor.[2]

2. *Contact Lens Forum,* Vol. 3, No. 3, March, 1978, pp. 13–17.

There are several problems with the printing type of technique. First, the color is only printed on the lens after it has been manufactured and, therefore, is not uniformly dispersed through the lens material itself. Dr. Meshel admits that the color does tend to fade after several autoclavings and recommends cold chemical sterilization.[3] Secondly, the clear lens must be first manufactured and fit on the patient's eye before the coloring takes place. This requires the lenses to be sent back to the manufacturing company by the patient's doctor. Thirdly, the printing process requires additional fabrication steps and equipment.

3. Ibid., p. 16.

Water soluble dyes have also been used to provide the tinting.[4] Newcomer and Janoff selected dyes on the basis of their wate solubility and previous F.D.A. approval for human use or for their commercial availability as biological dyes. The results of this work were that the water soluble dyes tend to leach, especially with repeated thermal aspeticizing cycles which could permanently stain the cornea. The authors also noted that the large diameter of the Soflens ® would cause the margin of a tinted lens to be very conspicuous against the white sclera of the eye and that this might produce an objectionable cosmetic effect for the wearer. In addition, water soluble dyes in long term contact with the eye might permantly stain the ocular tissue.

4. Newcomer, P. C. and Janoff, L. E., *American Journal of Optometry and Physiological Optics,* 54 (3) 160-164 (1977), "Methods of Tinting Soflens ® Contact Lenses."

Due to the large size of soft contact lenses, if the lens is of one color, the appearance on the eye is very unnatural. Therefore, a natural appearing soft contact lens should have a colored central area and a clear outer area so that the colored portion will not cover the sclera of the eye. Such a configuration, while very desirable, causes severe fabrication problems. The colors must not bleed or leach from one area of the lens to another, nor must they leach into the tear fluid and thereby ultimately into the eye. The colored area and the clear area must normally be concentric and be easily aligned in the fabrication step.

Ideally, the coloring compound dye should be stable in color and intensity and maintain a good tone, i.e., not cloudy or hazy after the lens is hydrated. In addition, it must not leach.

The more common water soluble dyes such as methylene blue chloride when used for this purpose will equilibrate on hydration to a point at which the lens is one solid color over its entire surface area.

The difficulties described above may be avoided by using water insoluble dyes or dyes which are so structured that they may be polymer bound to the backbone of the polymerized co-monomer mixture. In either case, a lens blank configuration is disclosed which allows for both clear and colored portions to be fabricated in the resulting contact lens.

The contact lens of the present invention, therefore, possesses the following properties and advantages:

1. A contact lens which appears completely natural as worn on the eye by having a colored portion which does not cover any of the sclera of the eye.
2. A colored lens which is completely safe for the wearer possessing a color which will not bleed or leach from the lens into the eye or from one part of the lens to another.
3. A contact lens which offers outstanding aesthetic beauty to the eye of the wearer as well as covering unattractive irregularities in the eye.
4. A colored contact lens which will retain its color despite aging or nightly sterilization, i.e., boiling.
5. A colored contact lens that can be completely fabricated before fitting the patient's eye.
6. A colored contact lens that can be fabricated by incorporating the teachings of the present invention with conventional lens manufacturing techniques thereby eliminating the need for additional equipment and processes.

SUMMARY OF THE INVENTION

The contact lens of the present invention contains a tinted central core which is colored by means of a dye that is dispersed throughout the core and an outer lens element which is usually clear.

The outer lens element of the contact lens is soft in nature and is formed from a button. This button which forms the outer lens element is in turn formed in a mold from the polymerization of a hydrogen co-monomer mixture.

The colored central core is formed from a tinted button which in turn is polymerized from a co-monomer mixture which includes a dye. This dye may be of two types: water insoluble or polymer bound. In the former case the water insoluble dye is added to the co-monomer mixture and this combination is polymerized. Due to its insolubility, the dye will not bleed or leach from the polymerized button.

In the latter case of the polymer bound dye, the dye is actually bonded to the polymer backbone of the polymerized co-monomer mixture. This polymer binding may occur in one of two ways. The dye may contain a polymerizable vinyl group and, therefore, when the dye is added to the co-monomer mixture and polymerized, the vinyl group serves to bind the dye to the polymer backbone. The dye may also be polymerized before it is added to the co-monomer mixture. In this situation the co-monomer mixture is graft polymerized to the already polymerized dye. By either mechanism the end result is that the dye is chemically bonded to the polymer backbone of the tinted button and, therefore, cannot bleed or leach from the button.

In one embodiment of the invention, the contact lens will have an inner tinted lens element surrounded by an outer lens element that is of the hydrogel type, i.e., formed from a hydrogel co-monomer mixture. The inner tinted lens element is not restricted to the hydrogels and may be of any desired hardness ranging from a soft hydrogel lens to a conventional "hard" lens. The degree of rigidity can be controlled by adding varying amounts of a strengthening monomer, i.e., styrene or alkyl or aryl methacrylate to the co-monomer mixture. In a further embodiment of the invention a plurality of outer lens elements may be employed. These elements will usually have increasing hydrateability with increasing diameter, i.e., approaching the edge of the lens from the center, so that the edge of the lens will not tend to wrinkle upon hydration.

The fabrication of the contact lens from the clear outer button and tinted inner button forms an important aspect of the present invention.

In general, there are two methods to fabricate the disclosed contact lens. The first method involves polymerizing the tinted button, placing the tinted button in a mold and pouring a hydrogel co-monomer mixture around the tinted button and polymerizing this mixture.

The second means of forming the disclosed contact lens is to polymerize the clear outer button initially and form a centrally positioned aperture through this button. The co-monomer mixture which includes a dye is then placed within this aperture and polymerized. Through these methods a contact lens with a colored central core can be fabricated by incorporating conventional lens manufacturing techniques. No additional instrumentation need be applied.

DESCRIPTION OF THE PREFERRED EMBODIMENT

The colored central core is formed from a tinted button. The button is polymerized in a mold by conventional lens blank manufacturing techniques from a co-monomer mixtue which includes a dye. The dye may be either water soluble or of the polymer bound type.

In one embodiment, the central core is to be of the conventional "hard" type of lens element. "Hard" lens is a term well known in the art. Hard lenses are polymerized from a monomer mixture which will not be of the hydrogel type. Therefore, the mixture will not include a hydrophilic substituent as one of its principal co-monomers. The most common principal monomer is an alkyl methacrylate (or acrylate) such as methyl methacrylate. A cross linking agent and polymerization initiator are also included.

In another embodiment of the invention the colored central core is a hydrogel tinted lens element. This will result in a soft core. A "hydrogel" lens is a term well known in the art and is defined to include lenses polymerized from a co-monomer mixture of the hydrogel type. The particular constituents used in this hydrogel co-monomer mixture are not critical to the present invention. There exists many opportunities for substitutions and variances in these mixtures. "Hydrogel co-monomer mixture" will now be described for purposes of illustration.

The principal co-monomer in order to form a hydrogel mixture is a hydrophilic monomer well known to those in the art and generally represents the various hydrophilic acrylates and methacrylates which are conventionally used in the present hydrogel lenses. More specifically, these monomers are hydroxy lower alkyl acrylates or methacrylates, hydroxy lower alkoxy lower alkyl acrylates or methacrylates, and alkoxy lower alkyl acrylates or methacrylates. A "lower alkyl" or "lower alkoxy" is herein defined to mean an alkyl or alkoxy of about five carbon atoms or less. These hydrophilic monomers include dihydroxy and trihydroxy alkyl acrylates and methacrylates such as 2,3 dihydroxypropyl methacrylates, or 2,3 dihydroxybutyl methacrylates, etc.

Examples of other hydrophilic monomers are hydroxy substituted or alkoxy substituted methacrylates or acrylates. The hydroxy substituted acrylates or methacrylates are generally disclosed or discussed in U.S. Pat. No. 3,983,083 issued to Kaetsu et al which is herewith incorporated by reference.

Other hydrophilic monomers are generally alkaline glycol monomethacrylate or acrylates. These are generally discussed in U.S. Pat. No. 3,988,274 issued to Manshura et al which is herewith incorporated by reference. Examples of these monomers are hydroxethyl methacrylate (HEMA), hydroxyethyl acrylate, hydroxypropyl methacrylate, hydroxypropyl acrylate, butanediol monomethacrylate, butanediol monoacrylate, and vinyl pyrrolidinone. Vinyl pyrrolidinone also serves as a dispensing agent for the dye.

The most preferred monomers are the hydroxyalkyl acrylates and methacrylates, particularly 2-hydroxyethyl methacrylate.

If the central colored core is to have increased rigidity, a strengthening monomer must be added to the hydrogel co-monomer mixture. These strengthening monomers are again well known in the art and are not of critical importance to the present invention. Examples of such monomers are alkyl acrylates or alkyl methacrylates, aryl acrylates or methacrylates and alkyl and aryl vinyl ethers. These monomers are known to possess the desired strength enhancing properties. Styrene monomers have the added advantage of being gas permeable and are, therefore, perferred. "Styrene monomers" are herein defined as any form of styrene or substituted styrenes such as alpha alkyl styrenes or vinyl toluene or the like alkylated or halogenated styrene.

Alkyl acrylates or methacrylates are well known in the art and include methacrylate, ethyl acrylate, isopropyl acrylate, propyl acrylate, butyl acrylate, sec. butyl acrylate, pentyl acrylate, 2-ethylhexyl acrylate, methyl methacrylate, ethyl methacrylate, propyl methacrylate, isopropyl methacrylate, butyl methacrylate, sec. butyl methacrylate, pentyl methacrylate and cyclohexyl methacrylate, and fluorinated acrylates and methacrylates.

Examples of aryl acrylates and methacrylates are phenyl acrylate, phenyl methacrylate, etc. An example of an alkyl or aryl vinyl ether is, ethyl vinyl ether and phenyl vinyl ether.

A cross-linking agent as is well known in the art is also added to the hydrogel co-monomer mixture. The cross-linking agents are exemplified by: diethylene glycol dimethacrylate, triethylene glycol dimethacrylate, tetraethylene glycol dimethacrylate, polyethylene glycol dimethacrylate, butylene glycol dimethacrylate, neopentyl glycol dimethacrylate, diethylene glycol bisallycarbonate, 2,3 epoxy propyl methacrylate, divinyl benzene, ethylene glycol diacrylate, ethylene glycol dimethacrylate, 1,3-butylene dimethacrylate, 1,3-butylene dimethacrylate, 1,4-butylene dimethacrylate, propylene glycol diacrylate, propylene glycol dimethacrylate, dipropylene glycol dimethacrylate, diethylene glycol diacrylate, dipropylene glycol diacrylate and trimethylol propane trimethacrylate.

A polymerization catalyst or initiator can also be added to the hydrogel co-monomer mixture in order to promote the polymerization. These initiators are well known to those in the art and are for example benzoyl peroxide, lauroyl peroxide, cumene hydro peroxide, di-tert-butyl peroxide, diisopropyl peroxycarbonate, azobisisobutyronitrile, t-butyl peroctoate, t-butyl perneodecanoate, t-tutyl perpivalate, 2,5-dimethyl hexane 2,5-diper-2-ethylhexoate or the like.

The term "dye" in this application is used in its most general sense and is expressly defined to include dyes, pigments, lakes, and mordants. Generally the dye may be either water insoluble or of the polymer bound type.

Dyes which are suitable for the present invention must have stability, the desired color, and solubility in the pH range of 6.5–8.5. This means that the dye must have a stable color and proper shade and possess the proper solubility (so that it will not leach out of the colored core) in this pH range.

There are a large number of water insoluble dyes which could be used in the present invention depending upon the color desired. "Water insoluble" is herein defined to mean no observable color in the aqueous phase. The most common colors desired in a contact lens are blue, gray, and green. Suitable water insoluble dyes for the purposes of this invention are: low solubility pigments such as iron oxide and lamp black and metal complexes such as phthalocyanines and organic Neozapon ® dyes. Neozapon is a product of B.A.S.F.-Wyandotte of Parisipany, N.J.

The phthalocyanine dyes provide a range of colors, depending upon the prope choice of the metal and the substituents on the phthalocyanine structure.

Copper phthalocyanine may be added to a hydrogel formulation of 2-hydroxy ethyl methacrylate (or acrylate), homogenized and cured to give a colored hydrogel suitable for soft contact lenses. Other hydrophilic monomers may also be employed, such as two or thee hydroxy propyl methacrylate (or acrylate, glycerol methacrylate (or acrylate), vinylpyrrolidinone, diacetone methacrylamide (or acrylamide) and the like.

Silicon phthalocyanine dyes of the type shown in Formula 1 below have been described by Wynne et al Macromolecules 11(1), 186 (1978) and by Castillo, Rev. Univ. Ind. Santander Invest., 7(7), 46–60 (1977), and the references therein, both of which are herein incorporated by reference.

FORMULA 1

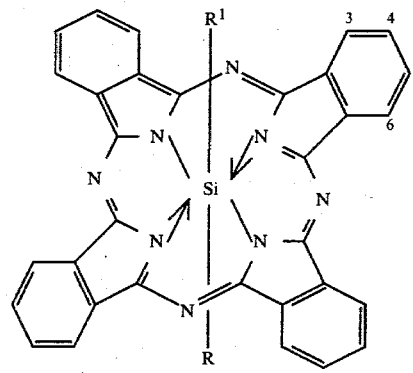

In the previous work, R and R' have been Cl or OH or a siloxane chain of from one to three silicon units with methyl and phenyl substituents. It was also shown that as the silicone chain increased in length, the solubility in organic compounds also increased.

The dye may also be of the polymer bound type rather than water insoluble. The polymer binding of the dye may occur in one of two ways. First, the dye may contain a polymerizable vinyl group. The term "polymerizable vinyl group" as used in this disclosure means a substituent providing a carbon-carbon double bond such that the molecule to which it is attached, i.e., the dye, may be polymerized, such as vinyls per se, acrylates, methacrylates, acrylamides, or methacrylamides.

Examples will now be given of reactants which are added to the dyes in order to produce a particular type of polymerizable vinyl group on the dyes. These dyes will then be subsequently polymerized or added to the co-monomer mixture. The perferability of these reactants will depend upon the precise chemical structure of the dye itself. For example, the reactants with amino moieties would be most useful with dyes containing a functional group such as $CH_2Cl$.

Examples of reactants which form the vinyl per se functional group are vinyl ethers such as 2 chloro ethyl vinyl ether, chloro propyl vinyl ether and analogs of the above including allyl, crotyl, etc., analogs, and allyl, butenyl, etc. halides.

Examples of reactants which form the acrylate functional group are dimethylaminoethyl acrylates, dimethylaminopropyl acrylate, dimethylaminobutyl acrylate and analogs of all of the above.

Examples of reactants which form the methacrylate functional group are dimethylamino ethyl methacrylate, dimethylaminopropyl acrylate and analogs of all of the above.

Other examples of reactants which form the methacrylate functional group are 2-chloroethyl methacrylate and the like.

Examples of reactants which form the acrylamide functional group are dimethylaminoethyl acrylamides, dimethylaminopropyl acrylamide, and analogs of all of the above.

Examples of reactants which form the methacrylamide functional group are dimethylaminopropyl methacrylamide, dimethylaminoethyl methacrylamide, and the diethylamino and methylethylamino analogs of all of the above. Difunctional methacrylamides are also contemplated such as aminoethyliminoethyl dimethacrylamide, aminopropyliminoethyl dimethacrylamide, etc., and aminopropylpiperazinepropyl dimethacrylamide.

The dye with the attached polymerizable vinyl group is then treated as a co-monomer like the others in the mixture. Upon polymerization, the dye becomes polymer bound to the polymer backbone which forms the tinted button.

The second way of polymer binding the dye is to polymerize the dye intitially and thereafter graft polymerize the co-monomer mixture to the already polymerized dye. This also binds the dye to the polymer backbone of the tinted button.

If the polymer bound dye is of the water soluble type, the polymerized colored button should be rinsed to ensure that no unpolymerized dye remains before the next casting step is undertaken. This means that when using a polymer bound dye of the water soluble type in order that the colored buttons may be rinsed, the method of fabrication should be chosen in which the colored button is formed first and the clear outer button is polymerized around it, as will be further described hereinafter. The particular type of dye which is selected is not of importance for the present invention, so long as the dye contains a polymerizable vinyl group. Again, however, the dye should have the proper stability and color in the pH range 6.5–8.5.

By way of illustration, a suitable dye of the polymer bound type is the silicon phthalocyanine compound depicted in Formula 1.

If a silicon phthalocyanine compound were prepared in which the R and R' group contained a polymerizable vinyl group, then this compound could be co-polymerized with another polymerizable vinyl group to give a polymer in which the dye is bound to the polymer backbone. An example of the above is shown below in Formulas 2 and 3.

FORMULA 2

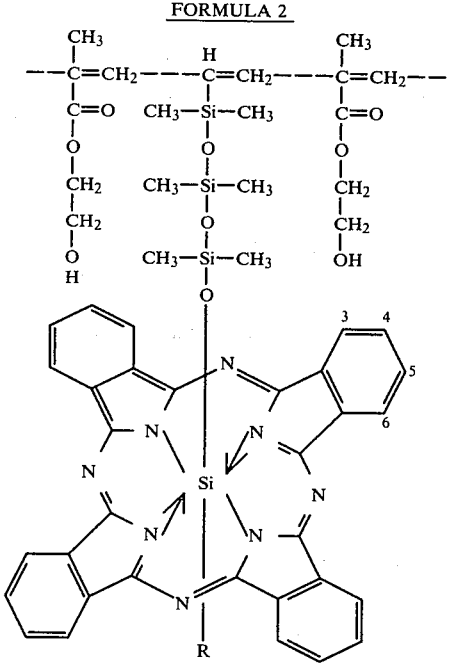

FORMULA 3

-continued

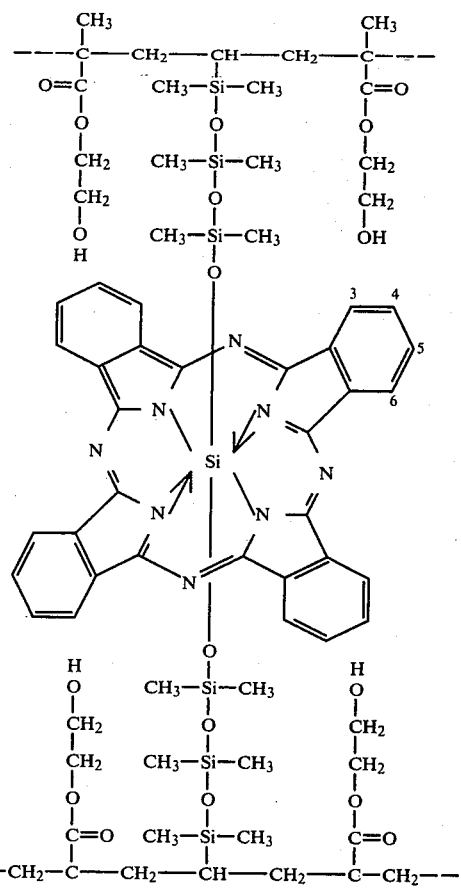

The R groups on the silicon phthalocyanine need not be the same, and only one polymerizable group is necessary.

The R group could also be an acrylic group as shown below in Formula 4.

The phthalocyanine dyes may be made water soluble by adding —$SO_3H$ or —$SO_3Na$ groups to the phthalocyanine nucleus. They may also be made to polymerize by adding a vinyl group to the phthalocyanine nucleus. In this manner a water soluble-polymer bound phthalocyanine dye may be formed. Other water solublyzing groups may also be added to the phthalocyanine nucleus.

FORMULA 4

This grouping would polymerize well with the acrylic monomers.

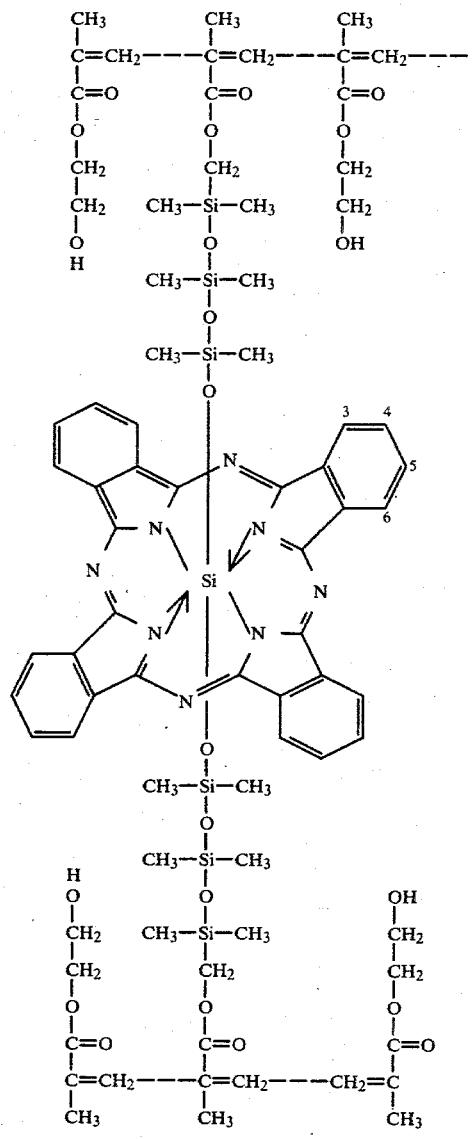

"Lens" or "lens element" is herein defined to include devices applied to the eye for any purpose such as cosmetic, optical or medical.

The monomers of the co-monomer mixture including the dye are mixed conventionally and placed in an oven to begin the polymerization (curing). Such polymerization is carried out conventionally between 40° C. and 100° C. Preferably, the mixture is cured in the molds at about 65° C. for about 1-4 hours to form cylindrical lens blanks. The blanks are then annealed several hours at approximately 85° C.

For most applications of this invention the lens blank which will form the outer element is clear. Of course, this element may be tinted if desired by using the dyes as described above in the comonomer mixture. However, normally since this outer lens element covers the white portion of the eye, it would not be desired to have this element possessing any color. Therefore, the co-monomer mixture used to form the blank will normally not include any type of dye and the resulting button will, therefore, be clear and colorless.

The outer lens element which surrounds the colored central core is of the hydrogel type. This means that it is formed from a button which in turn is formed from polymerizing a hydrogel comonomer mixture. The term "hydrogel co-monomer mixture" has been described and defined above although the exact constituents of the hydrogel co-monomer mixture need not be identical with those constituents which are used in the mixture which is polymerized to form the tinted button.

As is the case for the hydrogel mixture used to form the tinted core, strengthening monomers such as styrenes or alkyl methacrylate may be added to increase the strength of the soft outer element.

In an embodiment of the invention, the colored core is surrounded by a plurality of outer lens elements which form rings about the colored core much like ripples in a pond from the impact of a stone. It should be noted, that the rings will usually be concentric. The plurality of outer lens elements which will always be of the hydrogel type, may have any degree of softness desired by varying the amount of strengthening monomer, i.e., styrene, which is added to the hydrogen mixture. In addition, some of the lens elements may be tinted with a dye as described for the core element. Those elements which are colored would normally be the inner most rings so that the problem of covering the schlera of the eye with color is avoided. The use of a plurality of outer lens elements is most important in hard-soft lenses, i.e., when the core is hard and outer elements are soft. In this case, the hydrateability of these elements is increased with increasing diameter of the rings, i.e., from the core of the lens out to the elements on the edge of the lens. This increasing hydration level out to the edge of the lens will help in preventing the edge from wrinkling and crimping upon hydration which has been discovered to be a potential problem in making a combination hard-soft lens as described in an embodiment of the invention.

The blanks which will form the outer lens elements are cured by the conventional techniques that have been described above.

The methods used to combine the tinted button which will result in the colored core and the clear button which results in the outer lens element is a significant contribution to the present invention.

The fabrication technique will be described for a lens which has a single outer lens element. However, it will be clear to those in the art that these techniques can be used to fabricate a lens with a plurality of outer lens elements.

Generally, there are two ways of fabricating the lens blank which is formed from both the tinted button and the clear button. By the first method, the tinted button is polymerized first, placed in a mold and a hydrogel co-monomer mixture is poured around the periphery of the tinted button and polymerized. The second method is to polymerize the clear button initially and form a centrally positioned aperture through this clear button. The co-monomer mixture including the dye is then poured within this aperture and polymerized.

According to the first method, the tinted button may be formed of a regular soft contact lens blank size and thereafter cut or machined down to a smaller size suitable for forming the colored core of the resulting lens. A flange may be left around the lower part of the button to give it more stability in the mold. Alternatively, the tinted button may be formed in a smaller size mold than is required for a soft contact lens blank.

The smaller sized tinted button would then be placed in the mold of a size suitable for a soft contact lens blank. The co-monomer hydrogel mixture may then be poured into this mold around the smaller sized tinted button and polymerized. In this method the diameter of the plug or tinted button determines the diameter of the tinted area.

A second method is to polymerize the clear button first, a centrally positioned aperture which extends through the clear button is then formed. This may be done simultaneously with the polymerization step by polymerizing the clear button in a centrifuge. The centrifugal force which is applied during the polymerization will result in a clear button which has an aperture extending through the middle portion of the button. Alternatively, a clear button may be formed conventionally and an aperture may be cut or drilled through the clear button. A third possibility is to form the outer element in a mold containing a central post thereby forming an aperture in the polymerized button. In all cases, the comonomer mixture including the dye would then be poured into the aperture and polymerized.

A third method for forming the clear and tinted button combination is to form either a tinted or clear button of the normal soft contact lens blank size, slice this button in half and polymerize a co-monomer mixture of the opposite type, i.e., tinted or clear, onto the originally formed button thereby forming a "double layer" button with the lower portion of the button being tinted or clear and the upper portion being the opposite. In the cutting step the colored portion should be on the bottom so that the depth of cut used in forming the base curve will determine the diameter of the tinted area.

The following examples are for illustration only and are not to be construed as limiting the scope of the invention.

EXAMPLE 1

| Colored formulation | |
|---|---|
| 2-hydroxyethyl methacrylate | 30.00 g |
| methyl methacrylate | 0.90 g |
| triethyleneglycol dimethacrylate | 0.30 g |
| copper phthalocyanine blue | 0.30 g |
| 2,5-Dimethyl hexane-2,5 diper-2-ethylhexoate (U.S. Peroxygen Division, Witco Chemical Co., U.S.P 245) | 4 drops |

The above was thoroughly mixed and cured at 80°–94° C. for one hour and then up to 111° C. for an additional 2 hours. The blanks from this formulation were machined into two configurations, a disk with a thickness about ⅓ the depth of the mold and also a plug with a lower flange. Both configurations fit firmly in the bottom of the mold.

These colored hydrogel sections were then placed in separate molds and covered by a colorless hydrogel formulation of the following composition:

| 2-hydroxyethyl methacrylate | 30.00 g |
|---|---|
| Methyl methacrylate | 0.90 g |
| Triethyleneglycol dimethacrylate | 0.30 g |
| 2,5-dimethyl hexane-2,5 diper-2-ethylhexoate (U.S. Peroxygen Division, Witco Chemical Co., U.S.P. 245) | 4 drops |

The above formulation was thoroughly blended before being added to the molds. The mixture was cured from 86°–94° C. for 3 hours and 40 minutes, and from 90°–102° C. for an additional 2 hours.

Soft lenses were made from these blanks which had a blue central area and a colorless outer area, which had good optical quality and an equilibrium hydration level of 35.7%. The color in the central area did not "bleed" on hydration and repeated thermal asepticizing.

EXAMPLE 2

| Colored formulation | |
|---|---|
| 2-hydroxyethyl methacrylate | 30.00 g |
| Methyl methacrylate | 0.90 g |
| Triethyleneglycol dimethacrylate | 0.30 g |
| Silicon phthalocyanine (R + R′=CH$_2$=CH—Si(CH$_3$)$_3$ O—Si(CH$_3$)$_2$—O—Si(CH$_3$)$_2$—O—) or PcSi(O Si(CH$_3$)$_2$—O—Si(CH$_3$)$_2$—CH=CH$_2$)$_2$ | 0.14 g |
| 2,5-dimethyl hexane-2,5 diper-2-ethylhexoate (U.S. Peroxygen Division, Witco Chemical Co., U.S. p. 245) | 4 drops |

The above were thoroughly blended and cured at 85°–95° C. for one hour and from 95°–100° C. for two hours. The blanks from this formulation were machined into two configurations, a disk with a thickness about ⅓ the depth of the mold and also a plug with a lower flange. Each machined section fit firmly in the bottom of the mold. These colored hydrogel sections were then covered by a colorless hydrogel formation of the following formulation:

| 2-hydroxyethyl methacrylate | 30.00 g |
|---|---|
| Methyl methacrylate | 0.90 g |
| Triethyleneglycol dimethacrylate | 0.30 |
| 2,5-dimethyl hexane-2,5 diper-2-ethylhexoate (U.S. Peroxygen Division, Witco Chemical Co., U.S. p.245) | 4 drops |

The above formulation was blended thoroughly before being added to the molds. The mixture was cured from 85°–95° C. for four hours.

EXAMPLE 3

| Clear Outer Section A | |
|---|---|
| 2-Hydroxyethyl Methacrylate | 50.00 g |
| Methyl methacrylate | 1.50 g |
| Triethyleneglycol dimethacrylate | .50 g |
| t-Butyl perneodecanoate (Esperox33M, U.S. Peroxygen Division, Witco Chemical Co.) | 4 drops |
| 2,5-Dimethylhexane-2,5-Diper-2-ethyl hexoate, (U.S.P. 245, U.S. Peroxygen Div., Witco Chem. Co.) | 3 drops |

The above were thoroughly blended and placed in ½ inch diameter molds and cured 1 hour and 30 minutes 69°–71° C. The blanks were then machined to two configurations, one with an aperture cut through the blank and other having an aperture cut substantially through the blank. The diameter of the apertures were about 7 mm.

| Clear Outer Section B | |
|---|---|
| 2-Hydroxyethyl methacrylate | 50.00 g |
| Methyl metachrylate | 1.50 g |
| Triethyleneglycol dimethacrylate | 0.50 |
| t-Butyl perneodecanoate (Esperox33M, U.S. Peroxygen Div., Witco Chem. Co.) | 4 drops |
| 2,5 dimethylhexane-2,5-Diper-2-ethyl hexoate (U.S.P. 245, U.S. Peroxygen Div. Witco Chem. Co.) | 3 drops |

The above were thoroughly blended and then placed in molds and cured 1 hour at 68°–70° C. The molds used here were modified to provide a central post, which on curing gave a clear ring with a central area 7–9 mm in diameter. This method gave a clear ring with a very smooth molded surface on the inside as opposed to the coarse surface obtained by the machining as described in section A.

| Colored Central Section | |
|---|---|
| 2-hydroxyethyl methacrylate | 20.00 g |
| Methyl methacrylate | 0.60 g |
| triethyleneglycol dimethacrylate | 0.20 g |
| Copper phthalocyanine | 0.07 g |
| t-Butyl perneodecanoate (Esperox 33M, U.S. Peroxygen Div., Witco Chem. Co.) | 3 drops |
| 2,5-dimethyl-2,5-diper-2-ethyl hexoate (U.S.P. 245, U.S. Peroxygen Div. Witco Chem. Co.) | 2 drops |

The above were blended and added to molds containing blanks as described in clear outer Section A and B and cured at 81° C. for 4 hours and 30 minutes and 45 minutes at 84°–86° C.

Lenses fabricated from the blanks, and, on hydration in 0.9% saline solution, gave soft contact lenses with a blue central area (about 0.9 mm diameter) and a clear colorless outer area. The equilibrium hydration level of the lens was 34.4%, the wet optics were good. The dry lens blank had a hardness of 86–87D.

EXAMPLE 4

| Colored Central Section | |
|---|---|
| 2-hydroxyethyl methacrylate | 20.00 g |
| Methyl methacrylate | 0.60 g |
| Triethyleneglycol dimethacrylate | 0.20 g |
| Copper Phthalocyanine (Polysciences Cat#6483 Lot#1621) | 0.08 g |
| t-Butyl perneodecanoate (Esperox 33M, U.S. Peroxygen Div., Witco Chemical Co.) | 2 drops |
| 2,5-dimethyl hexane-2,5-diper-2-ethyl hexoate (U.S.P. 245, U.S. Peroxygen Div., Witco Chem. Co.) | 2 drops |

The above were blended with an ultrasonic mixer and placed in molds with clear outer Section A and B blanks as described in Example 3, with the exception that the blanks of Section A with the configuration of a blank with aperture cut only partially therethrough were used without molds. The blanks were cured at 68°–70° C. for 2 hours and 30 minutes and at 84°–86° C. for 3 hours.

The blanks from Example 4 machined and polished more easily than those of Example 2 and 3 and the color was also more uniform. The hardness of the dry blank was 86–88D.

EXAMPLE 5

| Clear Outer Section B | |
|---|---|
| 2-hydroxyethyl methacrylate | 50.00 g |
| Methyl methacrylate | 1.50 g |
| Triethyleneglycol dimethacrylate | 0.50 g |
| 5-Butyl perneodecanoate (Esperox 33M, U.S. Peroxygen Div., Witco Chem. Co.) | 4 drops |
| 2,5-dimethylhexane-2,5-diper-2-ethyl hexoate (U.S.P. 245, U.S. Peroxygen Div., Witco Chem. Co.,) | 2 drops |

The above were blended and placed in molds with a central post, similar to those used to make the clear outer Section B in Example 3. The blanks were cured at 70° C. for 45 minutes. The resultant blanks were placed in molds and the central cavity was filled with a colored monomer mixture made from 14.85 g of the above monomer mixture which was blended with 0.10 g of a mull, made from 3.00 g of copper phthalocyanine and 2.00 g of vinyl pyrrolidinone, which was homogenized on an ultrasonic blender. The mixture was cured at 74°–76° C. for 40 minutes, at 96° C. for 1 hour and 15 minutes and at 87° C. for 16 hours. Lenses were made from the above lens blanks and showed a hydration level of 34.3%, with a uniformly colored central core.

EXAMPLE 6

| Colored Central Section | |
|---|---|
| 2-hydroxyethyl methacrylate | 10.00 g |
| Methyl methacrylate | 0.30 g |
| Triethyleneglycol dimethacrylate | 0.10 g |
| Sodium Phthalocyanine | 0.06 g |
| t-Butyl Perneodecanoate (Esperox 33M, U.S. Peroxygen Div., Witco Chem. Co.) | 1 drop |
| 2,5-dimethylhexane-2,5-diper-2-ethyl hexoate (U.S.P. 245, U.S. Peroxygen Div., Witco Chem. Co.) | 2 drops |

The above were blended with an ultrasonic mixer and then added to molds containing colorless blanks with a central cavity. The mixture was cured at 67°–70° C. for one hour and 30 minutes and at 83°–86° C. for 4 hours and 30 minutes. Lenses made from the above blanks had a colorless outer area and a deep blue central area and a hydration level of 32.8%.

EXAMPLE 7

| Colored Central Section | |
|---|---|
| 2-hydroxyethyl methacrylate | 10.00 g |
| Methyl methacrylic | 0.30 g |
| Triethyleneglycol dimethacrylate | 0.10 g |
| Magnesium phthalocyanine | 0.05 g |
| t-Butyl Perneodecanoate (Esperox 33M, U.S. Peroxygen Div., Witco Chem. Co.) | 1 drop |
| 2,5-dimethylhexane-2,5diper-2-ethyl hexoate (U.S.P. 245, U.S. Peroxygen Div. Witco Chem. Co.) | 2 drops |

The above were blended with an ultrasonic mixer and then placed in molds containing colorless blanks with a central cavity. The mixture was cured at 67°–70° C. for 1 hour and 45 minutes and at 83°–86° C. for 4 hours and 30 minutes. Lenses made from the above blanks had a colorless outer area and a chartruse central area, with a hydration level of 33.7%.

EXAMPLE 8

| Colored Central Section | |
| --- | --- |
| 2-hydroxyethyl methacrylate | 10.00 g |
| Methyl methacrylate | 0.30 g |
| Triethyleneglycol dimethacrylate | 0.10 g |
| Zinc Phthalocyanine | 0.05 g |
| t-Butyl perneodecanoate (Esperox 33M, U.S. Peroxygen Div., Witco Chem. Co.) | 1 drop |
| 2,5-dimethylhexane-2,5-diper-2-ethyl hexoate (U.S.P. 245, U.S. Peroxygen Div., Witco Chem. Co.) | 2 drops |

The above were blended with an ultrasonic mixer and then placed in molds containing colorless blanks with a central cavity. The mixture was cured at 67°–70° C. for 1 hour and 32 minutes and at 83°–86° C. for 4 hours and 30 minutes. Lenses made from the above blanks had a colorless outer area and a blue-green central area, with a hydration level of 33.4%.

EXAMPLE 9

| Colored Central Section | |
| --- | --- |
| 2-hydroxyethyl methacrylate | 10.00 g |
| Methyl methacrylate | 0.30 g |
| Triethyleneglycol dimethacrylate | 0.10 g |
| Ferric phthalocyanine | 0.03 g |
| t-Butyl perneodecanoate (Esperox 33M, U.S. Peroxygen Div., Witco Chem. Co.) | 2 drops |
| 2,5-dimethylhexane-2,5-diper-2-ethyl hexoate (U.S.P. 245, U.S. Peroxygen Div., Witco Chem. Co.) | 1 drop |

The above were blended with an ultrasonic mixer and then placed in molds containing clear colorless blanks with a central cavity. The mixture was cured at 68°–70° C. for 1 hour and 30 minutes and at 83°–86° C. for 4 hours and 30 minutes. Lenses made from the above blanks had a colorless outer area and a grey central area, with a hydration level of 33.4%, in 0.9% saline.

EXAMPLE 10

| Colored Central Section | |
| --- | --- |
| 2-hydroxyethyl methacrylate | 20.00 g |
| Methyl methacrylate | 0.60 g |
| Triethyleneglycol dimethacrylate | 0.20 g |
| Neozapon Blue (FLE) BASF-Wyandotte Corp. | 0.20 g |
| 2,5-dimethylhexane-2,5-diper-2-ethyl hexoate (U.S.P. 245, U.S. Peroxygen Div. Witco Chem. Co.) | 4 drops |

The above were blended with an ultrasonic mixer and then placed in molds containing clear colorless blanks with a central cavity. The mixture was cured at 95° C. for two hours and 30 minutes and at 86° C. for 3 hours. Lenses made from the above blanks had a clear colorless outer area and a clear blue central area with a hydration level of 33.6% in 0.9% saline.

I claim as my invention:

1. In a contact lens comprising a central core element and an annular hydrogel soft lens element bonded to and surrounding the core element, the improvement wherein the central core is comprised of water insoluble colorant dispersed throughout the polymer forming the central core of lens element, the colorant consisting essentially of water insoluble copper phthalocyanine.

2. In a contact lens comprising a central core element and an annular hydrogel soft lens element bonded to and surrounding the core element, the improvement wherein the central core is comprised of water insoluble colorant dispersed throughout the polymer forming the central core of lens element, the colorant consisting essentially of water insoluble silicon phthalocyanine.

3. In a contact lens comprising a central core element and an annular hydrogel soft lens element bonded to and surrounding the core element, the improvement wherein the central core is comprised of water insoluble colorant dispersed throughout the polymer forming the central core of lens element, the colorant consisting essentially of water insoluble phthalocyanine colorant.

4. In a contact lens comprising a central core element and an annular hydrogel soft lens element bonded to and surrounding the core element, the improvement wherein the central core element is colored with a dye polymerically bonded to the lens polymer, said dye consisting essentially of silicon phthalocyanine polymerically bonded through a polymerizable group to the lens polymer.

* * * * *